(12) United States Patent
Hosoya et al.

(10) Patent No.: US 12,473,459 B2
(45) Date of Patent: Nov. 18, 2025

(54) TAPE MEMBER AND ELECTRONIC APPARATUS

(71) Applicant: LENOVO (SINGAPORE) PTE. LTD., Singapore (SG)

(72) Inventors: Satoshi Hosoya, Yokohama (JP); Takehito Yamauchi, Yokohama (JP); Keita Ishikawa, Yokohama (JP); So Nakanishi, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 445 days.

(21) Appl. No.: 18/187,641

(22) Filed: Mar. 21, 2023

(65) Prior Publication Data

US 2023/0407137 A1  Dec. 21, 2023

(30) Foreign Application Priority Data

Jun. 17, 2022  (JP) .................................. 2022-098119

(51) Int. Cl.
| | |
|---|---|
| *C09J 7/10* | (2018.01) |
| *B32B 3/26* | (2006.01) |
| *B32B 7/12* | (2006.01) |
| *G02F 1/1333* | (2006.01) |
| *G06F 1/16* | (2006.01) |

(52) U.S. Cl.
CPC .................. *C09J 7/10* (2018.01); *B32B 3/266* (2013.01); *B32B 7/12* (2013.01); *G02F 1/133308* (2013.01); *G06F 1/1637* (2013.01); *B32B 2405/00* (2013.01); *B32B 2457/00* (2013.01); *C09J 2203/318* (2013.01); *G02F 2202/28* (2013.01)

(58) Field of Classification Search
CPC .. C09J 7/10; C09J 2203/318; C09J 2301/308; C09J 2301/124; B32B 3/266; B32B 7/12; B32B 2405/00; B32B 2457/00; G02F 1/133308; G02F 2202/28; G06F 1/1637; G06F 1/1601
See application file for complete search history.

(56) References Cited

U.S. PATENT DOCUMENTS 10,870,258 B2 * 12/2020 Zeng ...................... C09J 201/02

FOREIGN PATENT DOCUMENTS

| JP | 2017114940 A | 6/2017 |
|---|---|---|
| JP | 2020186357 A | 11/2020 |

(Continued)

*Primary Examiner* — Patricia L. Nordmeyer
(74) *Attorney, Agent, or Firm* — SHIMOKAJI IP (57) ABSTRACT

A tape member includes a double-sided adhesive tape that can be pulled and peeled off by pulling an end portion, and a handle member that is attached to the end portion and gripped when the double-sided adhesive tape is pulled and peeled off. The handle member includes a first and second adhesive sheets fixed to first and second adhesive surfaces of the double-sided adhesive tape. The end portion is provided with a stopper edge portion extending in a direction intersecting a pulling direction at the time of pulling and peeling off. The handle member includes a hooking portion in which the first adhesive sheet and the second adhesive sheet are bonded to each other on the back side of the stopper edge portion in the pulling direction, and that is hooked on the stopper edge portion at the time of pulling and peeling off.

7 Claims, 9 Drawing Sheets

(56) References Cited

FOREIGN PATENT DOCUMENTS

| JP | 2022079985 A | 5/2022 | | |
|----|--------------|--------|---|---|
| JP | 2022166905 A | 11/2022 | | |
| JP | 2022166906 A | 11/2022 | | |
| WO | WO-2021137135 A1 * | 7/2021 | ............. | B32B 15/08 |

* cited by examiner

TAPE MEMBER AND ELECTRONIC APPARATUS

BACKGROUND OF THE INVENTION

Field of the Invention

The present invention relates to a tape member and an electronic apparatus in which a display panel is fixed by the tape member.

Description of the Related Art

An electronic apparatus such as a laptop PC includes a display panel such as a liquid crystal display and the like. It is desirable that the display panel be removable at the time of maintenance. Therefore, Japanese Unexamined Patent Application Publication No. 2022-079985 discloses a configuration in which a display panel is fixed by using a double-sided adhesive tape that can be pulled and peeled off.

SUMMARY OF THE INVENTION

For example, in the configuration in which the display panel is fixed with the double-sided adhesive tape as described above, it is necessary to extend a handle for gripping at the time of pulling and peeling off to a side of the display panel. However, depending on the chassis structure or the like, it may not be possible to dispose the handle near the fixed position of the display panel by the double-sided adhesive tape.

In such a case, a sheet serving as a puller member and the like may be attached to an end portion of the double-sided adhesive tape, and the sheet may be extended to the side of the display panel. However, it has been found that in a configuration in which the handle member is attached to the double-sided adhesive tape, the handle member may come off from the double-sided adhesive tape, for example, when the pulling distance of the double-sided adhesive tape is long or the like. If the handle member comes off from the double-sided adhesive tape during peeling, the double-sided adhesive tape remains on the back side of the display panel, and there is a concern that it may be difficult to remove the display panel.

The present invention has been made in consideration of the above-mentioned problems of the related art, and the object of the present invention is to provide a tape member capable of preventing a handle member from coming off from a double-sided adhesive tape, and an electronic apparatus in which a display panel is fixed by the tape member.

A tape member according to a first aspect of the present invention includes a double-sided adhesive tape having a property of being pulled and peeled off by pulling an end portion, and a handle member that is attached to the end portion of the double-sided adhesive tape and gripped when the double-sided adhesive tape is pulled and peeled off, in which the handle member includes a first adhesive sheet fixed to a first adhesive surface of the double-sided adhesive tape and a second adhesive sheet fixed to a second adhesive surface of the double-sided adhesive tape, a stopper edge portion extending in a direction intersecting a pulling direction at the time of pulling and peeling off is provided at the end portion of the double-sided adhesive tape, and the handle member includes a hooking portion in which the first adhesive sheet and the second adhesive sheet are bonded to each other on a back side of the stopper edge portion in the pulling direction, and that is hooked on the stopper edge portion at the time of pulling and peeling off.

An electronic apparatus according to a first aspect of the present invention includes a chassis member that includes an inner surface, a display panel that includes a display surface and of which back surface opposite to the display surface is supported on inner surface of the chassis member, and a tape member that includes a double-sided adhesive tape having a property of being pulled and peeled off by pulling an end portion, and a handle member that is attached to the end portion of the double-sided adhesive tape and gripped when the double-sided adhesive tape is pulled and peeled off, and that fixes the back surface of the display panel to the inner surface of the chassis member, in which the handle member includes a first adhesive sheet fixed to a first adhesive surface of the double-sided adhesive tape and a second adhesive sheet fixed to a second adhesive surface of the double-sided adhesive tape, a stopper edge portion extending in a direction intersecting a pulling direction at the time of pulling and peeling off is provided at the end portion of the double-sided adhesive tape, and the handle member includes a hooking portion in which the first adhesive sheet and the second adhesive sheet are bonded to each other on a back side of the stopper edge portion in the pulling direction, and that is hooked on the stopper edge portion at the time of pulling and peeling off.

According to the above aspect of the present invention, it is possible to prevent the handle member from coming off from the double-sided adhesive tape.

DETAILED DESCRIPTION OF THE INVENTION

Hereinafter, a tape member and an electronic apparatus according to the present invention will be described in detail with reference to suitable embodiments and the accompanying drawings.

Figure 1:
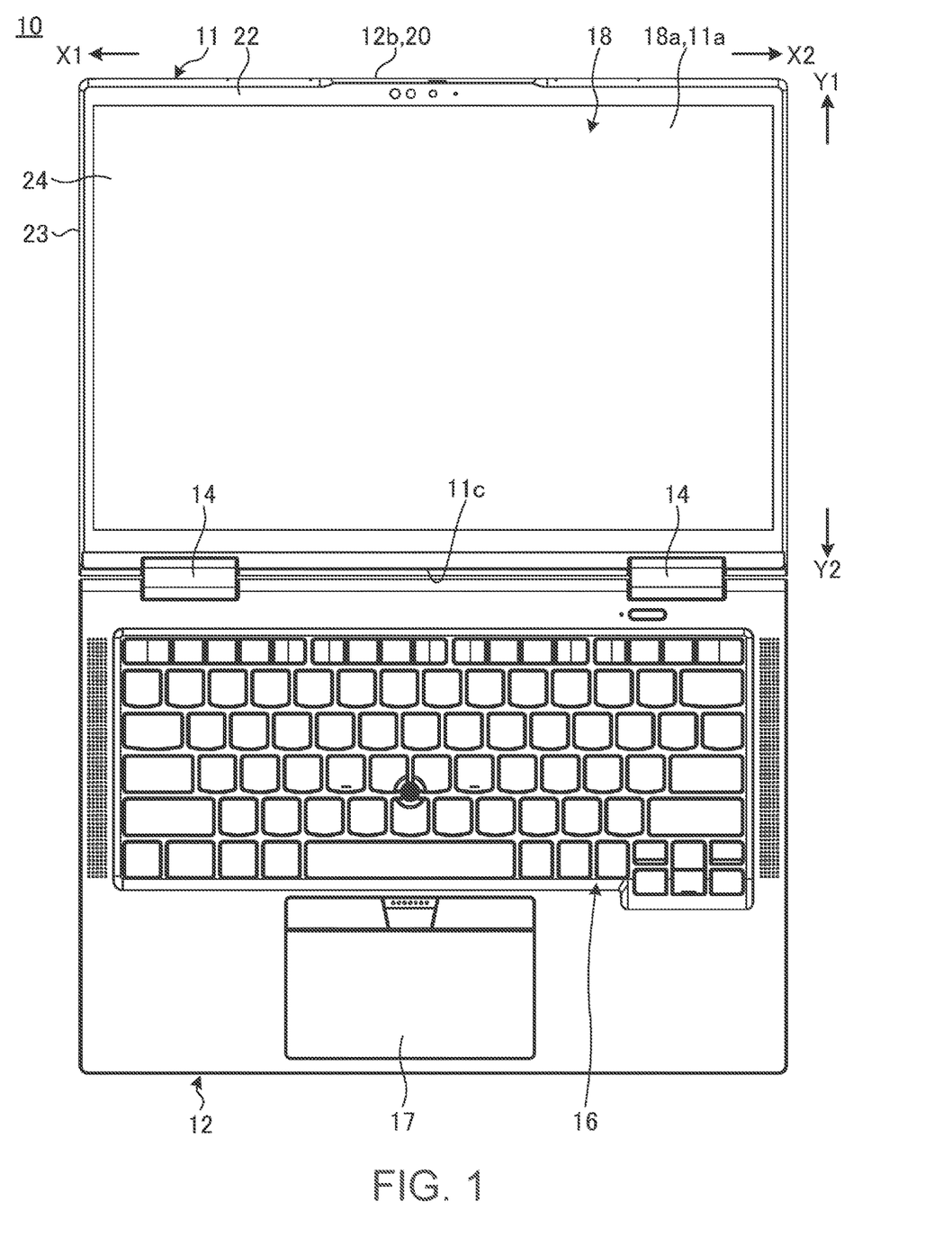
FIG. 1 is a schematic plan view of an electronic apparatus according to an embodiment as viewed from above.

FIG. 1 is a schematic plan view of an electronic apparatus 10 according to an embodiment as viewed from above. As illustrated in FIG. 1, the electronic apparatus 10 of the present embodiment is a clamshell type laptop PC, and has a configuration in which a first chassis 11 and a second chassis 12 are relatively rotatably connected by a hinge 14. In the present embodiment, the electronic apparatus 10 of the laptop PC is illustrated, but the electronic apparatus may be, for example, a single display device, a tablet PC, a smartphone, a portable game machine, or the like, in addition to the laptop PC.

The second chassis 12 is a flat box body and is adjacent to the first chassis 11. Inside the second chassis 12, various electronic components such as a motherboard on which a CPU and the like are mounted, a battery device, a memory, an antenna device, and the like are accommodated. A keyboard 16 and a touch pad 17 face the upper surface of the second chassis 12.

The first chassis 11 is a flat box body thinner than the second chassis 12. A display panel 18 is mounted on the first chassis 11. Hereinafter, the first chassis 11 will be described by calling the left and right directions X1 and X2 directions respectively, calling the up and down directions Y1 and Y2 directions respectively, and the front and rear directions Z1 and Z2 directions respectively when using a direction viewed from a user who visually recognizes a display surface 18a of the display panel 18 as a reference. The X1 and X2 directions may be collectively referred to as the X direction, and the Y1 and Y2 directions and the Z1 and Z2 directions may be similarly referred to.

The display surface 18a of the display panel 18 faces a Z1 side front surface (front surface 1a) of the first chassis 11. The first chassis 11 has a cover member 20 forming a Z2 side front surface (back surface 11b) and a bezel member 22 forming a peripheral edge portion of a front surface 11a. The upper, lower, left, and right side surfaces of the first chassis 11 are formed by a standing wall 23 that stands up from four peripheral edge portions of the cover member 20. The bezel member 22 is a frame-shaped thin plate material that surrounds the outer peripheral edge portion of the display panel 18. A substantially entire surface of the front surface 11a of the first chassis 11, including the bezel member 22, is covered with a touch glass 24. The hinge 14 is connected to a Y2 side edge portion (lower edge portion 11c) of the first chassis 11.

The display panel 18 is composed of, for example, a liquid crystal display or an organic EL display. The display panel 18 has a structure in which, for example, glass, a liquid crystal layer, a light guide plate, or the like are laminated, and the outer peripheral edge portions of each layer are fixed to each other with a double-sided tape, an adhesive, or the like. The touch glass 24 covers the display surface 18a to form a touch panel that receives a touch operation on the display panel 18.

Next, a more detailed configuration of the first chassis 11 will be described.

Figure 2:
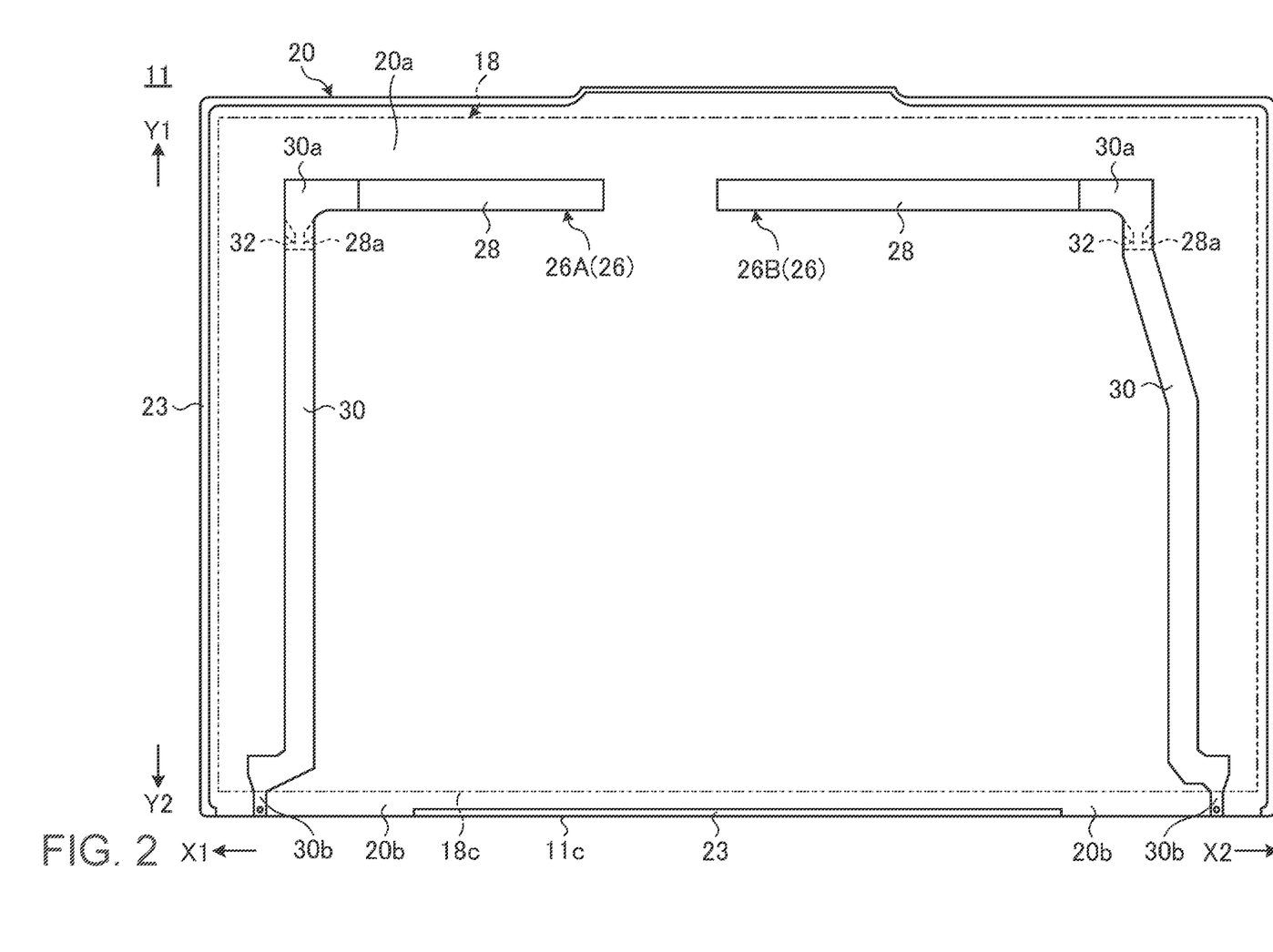
FIG. 2 is a schematic front view of a first chassis.

FIG. 2 is a schematic front view of the first chassis 11. In FIG. 2, the touch glass 24 and the bezel member 22 are not illustrated, and only the outer shape of the display panel 18 is illustrated by a two-point chain line. That is, FIG. 2 illustrates an inner surface 20a of the cover member 20 (the back surface of the back surface 11b) and the tape member 26 adhered to the inner surface 20a.

As illustrated in FIG. 2, the cover member 20 has a pair of left and right hinge mounting portions 20b in which a part of a standing wall 24a of the lower edge portion 11c is cut out. The hinge 14 is disposed in the hinge mounting portion 20b. The hinge mounting portion 20b also serves as a wiring path for connecting the display panel 18 and the motherboard or the like in the second chassis 12.

For example, a pair of left and right tape members 26A and 26B are provided on the inner surface 20a of the cover member 20. The tape members 26A and 26B are adhesive tapes for fixing the display panel 18 to the cover member 20. The number of double-sided adhesive tapes to be installed may be one or three or more. The tape members 26A and 26B of the present embodiment are different in shape and disposition, but have the same or similar functions and effects. Therefore, in the following, the tape members 26A and 26B will be collectively referred to as the tape member 26 without distinguishing between the two members.

A structure for attaching the display panel 18 to the cover member 20 will be described.

Figure 3:
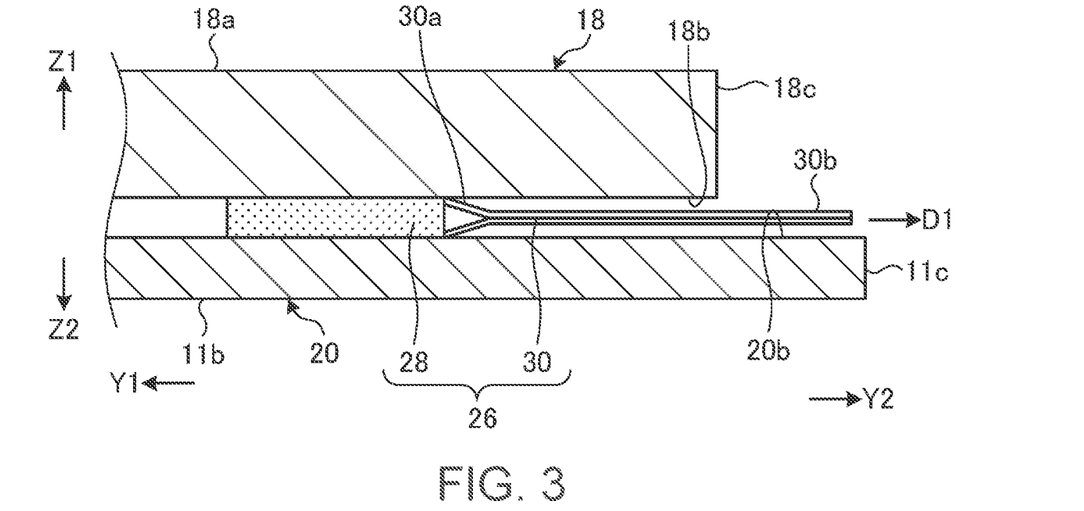
FIG. 3 is a side cross-sectional view schematically illustrating a configuration in which a display panel is fixed to a cover member by using a tape member.

FIG. 3 is a side cross-sectional view schematically illustrating a configuration in which the display panel 18 is fixed to the cover member 20 by using the tape member 26. As illustrated in FIGS. 2 and 3, the tape member 26 includes a double-sided adhesive tape 28 and a handle member 30.

The double-sided adhesive tape 28 adhesively fixes a back surface 18b of the display panel 18 opposite to the display surface 18a and the inner surface 20a of the cover member 20. The double-sided adhesive tape 28 has a property of being pulled and peeled off by pulling an end portion 28a, and is a component called, for example, a stretch release tape, a stretch double-sided tape, or a Lara tape.

As illustrated in FIG. 2, the first chassis 11 of the present embodiment has a configuration in which a position close to the Y1 side end portion of the display panel 18 is fixed to the inner surface 20a with the double-sided adhesive tape 28. Here, in the first chassis 11, the front surface 11a is covered with the touch glass 24, and the back surface 11b is covered with the cover member 20. For this reason, in the first chassis 11, the installation space of the handle when pulling and peeling off the double-sided adhesive tape 28 is limited to the lower edge portion 11c provided with the hinge mounting portion 20b. Therefore, it is conceivable that the double-sided adhesive tape 28 extends from a position close to the Y1 side end portion of the display panel 18 to the hinge mounting portion 20b.

However, since the component cost of the double-sided adhesive tape 28 is high, it is desired to minimize the amount used. Further, the double-sided adhesive tape 28 is cut out from a large-sized material sheet and formed into a predetermined shape, but in a long L-shape such as the tape member 26 illustrated in FIG. 2, the number of sheets taken from the material sheet is reduced, and the component cost will increase further. Furthermore, since the double-sided adhesive tape 28 has a certain thickness, it may be difficult to extend between the back surface 18b of the display panel 18 and the inner surface 20a of the cover member 20 over a long distance.

Therefore, the tape member 26 of the present embodiment adopts a configuration in which the handle member 30 is attached to the end portion 28a of the double-sided adhesive tape 28, and the double-sided adhesive tape 28 is pulled and peeled off by pulling the handle member 30. The handle member 30 is a sheet-like member thinner than the double-sided adhesive tape 28. A first end portion 30a of the handle member 30 is adhesively fixed to the end portion 28a between the back surface 18b and the inner surface 20a. A second end portion 30b of the handle member 30 extends to a position extending to a side of the side surface 18c of the display panel 18. The second end portion 30b is a portion that is actually gripped by a tool or a human when pulling and peeling off the double-sided adhesive tape 28.

Therefore, in the electronic apparatus 10 of the present embodiment, when the display panel 18 is removed from the cover member 20, for example, the hinge 14 is removed to remove the first chassis 11 from the second chassis 12. At this time, the wiring between the display panel 18 and the motherboard or the like is also removed. Subsequently, it is possible to pull and peel off the double-sided adhesive tape 28 by gripping the second end portion of the handle member 30 exposed to the hinge mounting portion 20b and pulling the second end portion 30b in the Y2 direction. As a result, the display panel 18 is smoothly removed from the cover member 20.

Next, a specific configuration example of the tape member 26 will be described.

Figure 4:
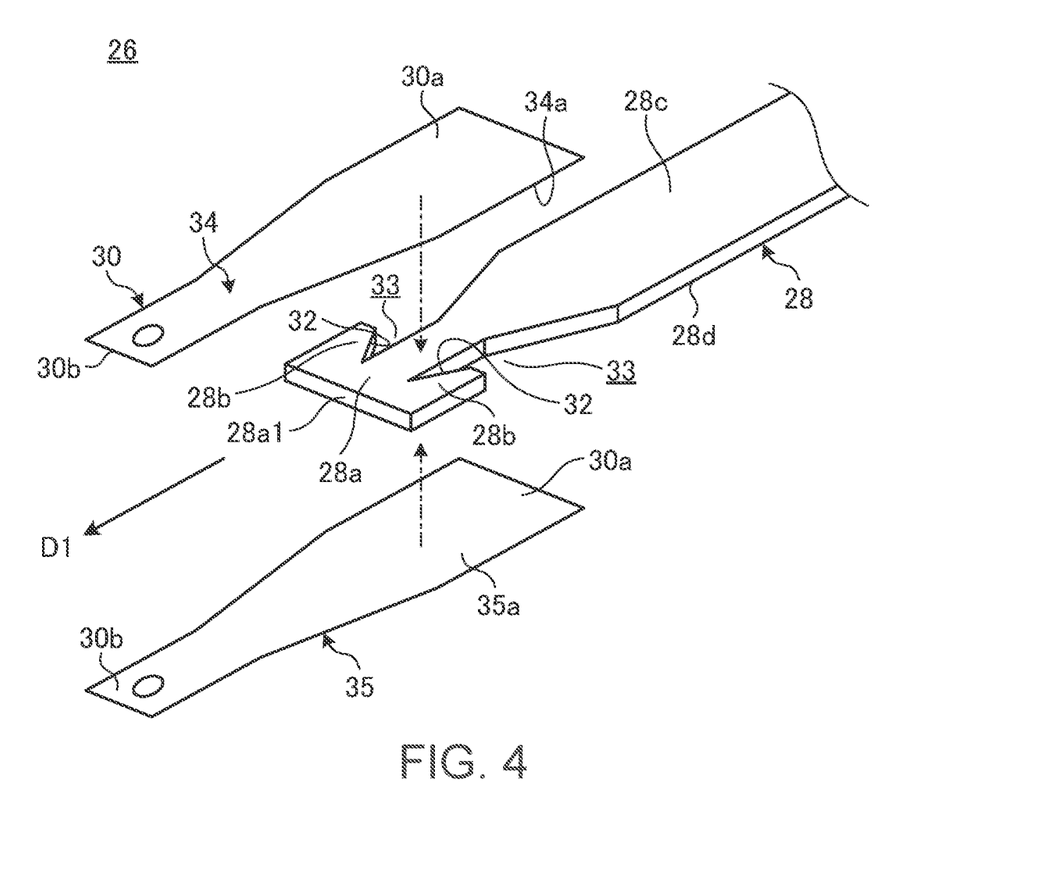
FIG. 4 is an enlarged schematic exploded perspective view of an attachment portion between a double-sided adhesive tape and a handle member, and a peripheral portion thereof.
Figure 5:
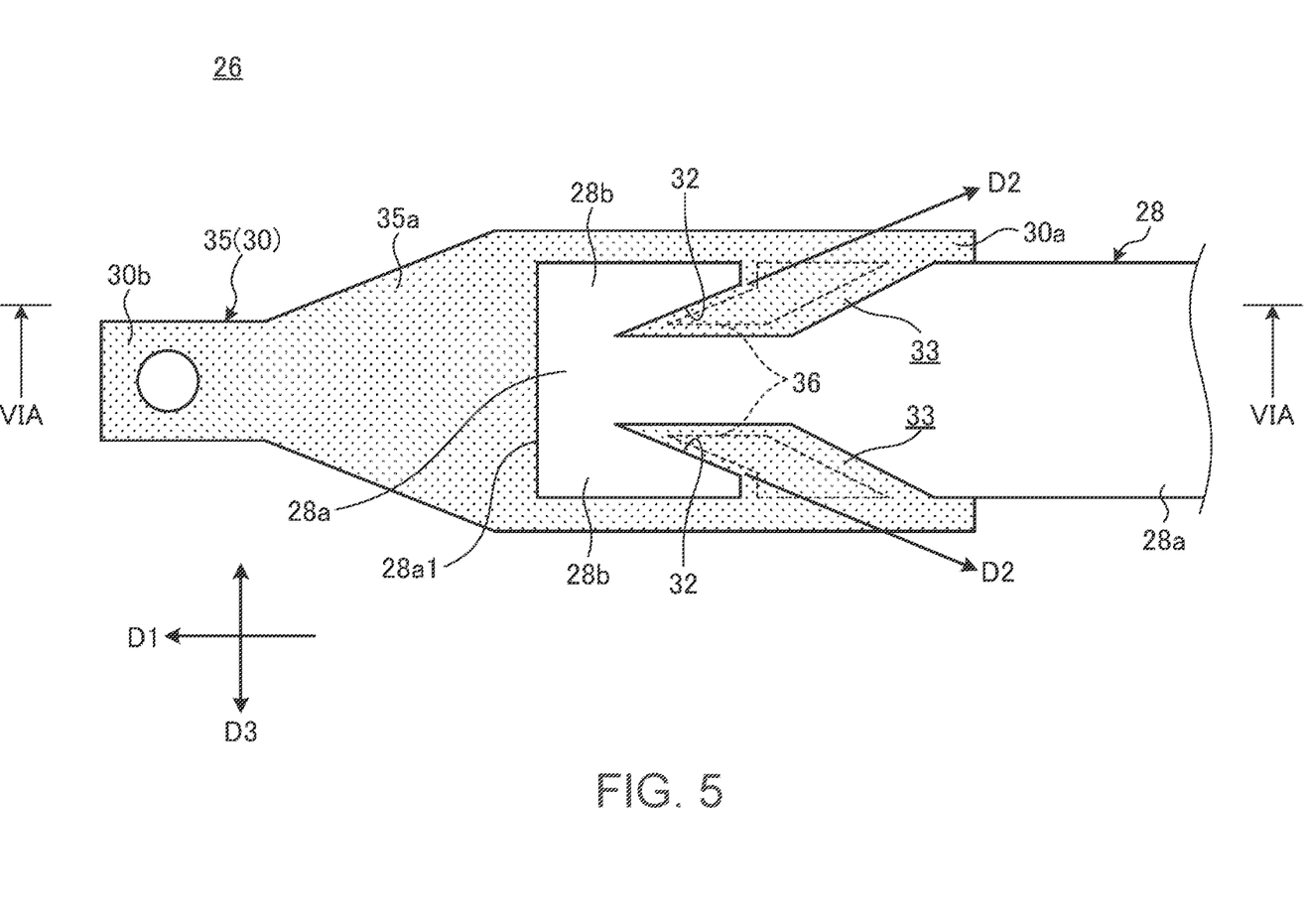
FIG. 5 is an enlarged schematic plan view of the attachment portion between the double-sided adhesive tape and the handle member and the peripheral portion thereof.
Figure 6A:
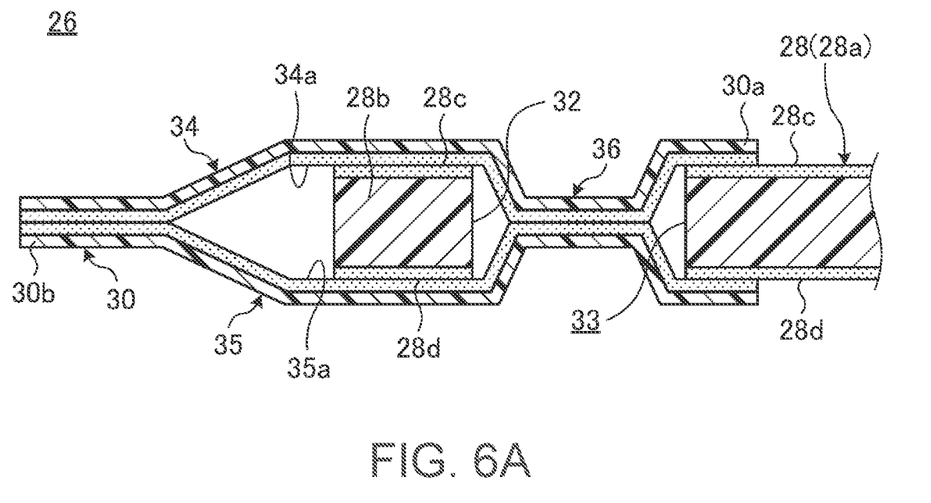
FIG. 6A is a schematic cross-sectional view taken along the line VIA-VIA in FIG. 5.
Figure 6B:
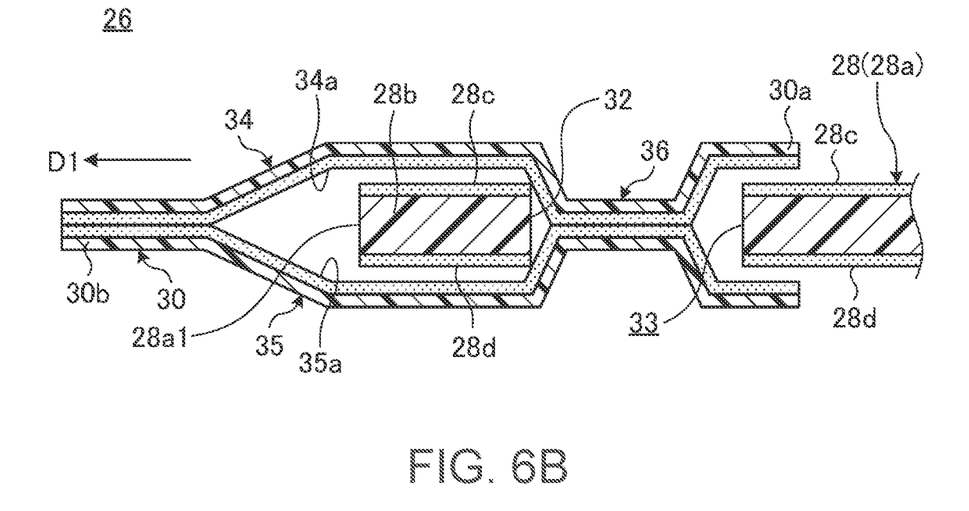
FIG. 6B is a schematic cross-sectional view illustrating an operation of pulling the handle member illustrated in FIG. 6A to pull and peel off the double-sided adhesive tape.

FIG. 4 is an enlarged schematic exploded perspective view of an attachment portion between the double-sided adhesive tape 28 and the handle member 30, and a peripheral portion thereof. FIG. 5 is an enlarged schematic plan view of the attachment portion between the double-sided adhesive tape 28 and the handle member 30, and the peripheral portion thereof, and the first adhesive sheet 34 of the handle member is not illustrated. FIG. 6A is a schematic cross-sectional view taken along the line VIA-VIA in FIG. 5. FIG. 6B is a schematic cross-sectional view illustrating an operation of pulling the handle member 30 illustrated in FIG. 6A to pull and peel off the double-sided adhesive tape 28.

As illustrated in FIGS. 4 to 6A, a pair of stopper edge portions 32 are formed on the end portions 28a of the double-sided adhesive tape 28. Each stopper edge portion 32 is a part of an inner peripheral surface of a notch portion 33 notched in the center direction from the side surface of the double-sided adhesive tape 28. Each stopper edge portion 32 faces a side opposite to an end surface 28a1 of the end portion 28a with respect to a pulling direction D1 when pulling and peeling off the double-sided adhesive tape 28. A residual portion 28b on which the double-sided adhesive tape 28 remains is formed between each stopper edge portion 32 and the end surface 28a1.

Each of the stopper edge portions 32 is provided on the left and right sides of the double-sided adhesive tape 28 with the center in the width direction interposed therebetween, and has a bilaterally symmetrical shape. Each stopper edge portion 32 is an edge portion extending in a direction intersecting the pulling direction D1. Specifically, each of the stopper edge portions 32 extends toward a direction opposite to the pulling direction D1 along an inclination direction D2 gradually inclined from the center in the width direction to the outside in the width direction of the double-sided adhesive tape 28. Therefore, when viewed with reference to the center in the width direction of the double-sided adhesive tape 28, the inclination direction D2 is a direction inclined in a direction opposite to the pulling direction D1 rather than an orthogonal direction D3 orthogonal to the pulling direction D1. As a result, the end portion 28a of the double-sided adhesive tape 28 has a substantially anchor shape in a plan view. In this case, the end portion 28a indicates a predetermined range, for example, a range of about 10 mm from the end surface 28a1 of the double-sided adhesive tape 28 toward the pulling direction D1. The end surface 28a1 may be 10 mm or less, or may be 10 mm or more. Only one of the left and right stopper edge portions 32 may be provided, and the other may be omitted. The same may apply to stopper edge portions 40, 42, 48, 54, 56, and 58 according to the modification examples described later. For example, when the width dimension of the double-sided adhesive tape 28 is 8 mm, the width of the stopper edge portion 32 along an orthogonal direction D3 can be set to about 2 mm, and the length of the stopper edge portion 32 along the pulling direction D1 can be set to about 2 mm.

As illustrated in FIGS. 4 to 6A, the handle member 30 has a first adhesive sheet 34 and a second adhesive sheet 35.

The adhesive sheets 34 and 35 are single-sided adhesive tapes, respectively. The adhesive sheets 34 and 35 are provided so that the first end portions 30a is disposed to overlap the end portions 28a of the double-sided adhesive tape 28 with respect to the pulling direction D1 and with the end portions 28a interposed from above and below. In the first adhesive sheet 34, an adhesive surface 34a is adhesively fixed to the first adhesive surface 28c of the double-sided adhesive tape 28, thereby covering the first adhesive surface 28c of the end portion 28a. In the second adhesive sheet 35, an adhesive surface 35a adheres to a second adhesive surface 28d of the double-sided adhesive tape 28, thereby covering the second adhesive surface 28d of the end portion 28a. In the adhesive sheets 34 and 35, the adhesive surfaces 34a and 35a are bonded to each other at a portion where the adhesive surfaces are not adhered to the adhesive surfaces 28c and 28d.

The adhesive sheets 34 and 35 also cover the stopper edge portion 32 of the double-sided adhesive tape 28 and the peripheral portion thereof. Here, the double-sided adhesive tape 28 includes the notch portion 33 behind the stopper edge portion 32 with respect to the pulling direction D1. The adhesive sheets 34 and 35 include a hooking portion 36 in which the adhesive surfaces 34a and 35a are bonded to each other through the notch portion 33. The hooking portion 36 is disposed on the back side of each stopper edge portion 32 in the pulling direction D1.

Next, an operation of pulling and peeling off the double-sided adhesive tape 28 via the handle member 30 and an acting effect of the tape member 26 will be described.

As illustrated in FIGS. 6A and 6B, when pulling and peeling off the double-sided adhesive tape 28, the second end portion 30b of the handle member 30 is gripped by a tool or a human hand and pulled in the pulling direction D1. Then, the double-sided adhesive tape 28 is pulled in the pulling direction D1 by the handle member 30. As a result, the double-sided adhesive tape 28 is thinned so as to gradually taper from the front end portion 28a side in the pulling direction D1 (see FIG. 6B), and the adhesive surfaces 28c and 28d are peeled off from the back surface 18b of the display panel 18 and the inner surface 20a of the cover member 20. The tape member 26 can pull out the double-sided adhesive tape 28 peeled from the back surface 18b and the inner surface 20a to the side of the display panel 18 by further pulling the handle member 30.

By the way, as described above, in the first chassis 11 of the present embodiment, since the double-sided adhesive tape 28 is located at a position far away from the side surface 18c of the display panel 18 (see FIG. 2), the handle member 30 is long and the distance of the double-sided adhesive tape 28 pulled out by the handle member 30 is also long. In such a configuration, as in the above-described related art, in a case where the handle member 30 is attached to the double-sided adhesive tape 28 only by an adhesive force, the fixing between the two members may be released during the pulling-out operation. Then, the double-sided adhesive tape 28 remains on the back surface 18b side of the display panel 18, making it difficult to remove the display panel 18. On the other hand, even in a configuration in which the handle member 30 is attached to the double-sided adhesive tape 28 only by an adhesive force, if the overlap distance between the handle member 30 and the double-sided adhesive tape 28 is sufficiently secured, the fall of the handle member 30 can be suppressed. However, in this case, the actual adhesive surfaces 28c and 28d of the double-sided adhesive tape 28, that is, the area where the display panel 18 adheres to the cover member 20 is reduced, and the adhesive strength of the display panel 18 is reduced.

In this respect, in the tape member 26 of the present embodiment, the stopper edge portion 32 is provided at the end portion 28a of the double-sided adhesive tape 28, and the hooking portion 36 in which the adhesive sheets 34 and 35 of the handle member 30 are bonded to each other is located on the back side of the stopper edge portion 32 in the pulling direction D1. Therefore, as illustrated in FIG. 6B, in the electronic apparatus 10, for example, even if the adhesive surfaces 34a and 35a on the first end portion 30a side of the adhesive sheets 34 and 35 are peeled off from the adhesive surfaces 28c and 28d of the double-sided adhesive tape 28, the hooking portion 36 is hooked on the stopper edge portion 32 and is prevented from coming off. That is, the stopper edge portion 32 physically locks the hooking portion 36, and may be referred to as a barb-shaped portion or an undercut-shaped portion.

As a result, the electronic apparatus 10 can suppress the occurrence of a situation in which the double-sided adhesive tape 28 remains on the back surface 18b side of the display panel 18, making it difficult to remove the display panel 18.

Here, in a comparative example in which the handle member 30 is simply attached to the double-sided adhesive tape 28 only by an adhesive force, and in an example having the stopper edge portion 32 and the hooking portion 36, the experiment results comparing the pulling distances of the double-sided adhesive tape 28 until the handle member 30 falls off will be described. In the experiment, in a state where the double-sided adhesive tape 28 was adhered to the back surface 18b and the inner surface 20a, when the handle member 30 was gripped and pulled, a pulling distance until the handle member 30 fell off from the double-sided adhesive tape 28 was measured. As a result of the experiment, in the comparative example, the handle member 30 fell off at about 20 cm, whereas in the example, the handle member 30 fell off at about 55 cm. Therefore, the effect of suppressing the fall of the handle member 30 in the tape member 26 of the present embodiment has been proved in the experiment.

Moreover, as described above, the double-sided adhesive tape 28 has a property of being thinned so as to gradually taper from the end portion 28a side at the time of pulling and peeling off (see FIG. 6B). Therefore, in the tape member 26, the double-sided adhesive tape 28 comes off easily from the adhesive sheets 34 and 35 when simply adhesively fixing the adhesive sheets 34 and 35 to the upper and lower adhesive surfaces 28c and 28d of the double-sided adhesive tape 28 in the same way that the double-sided adhesive tape 28 is smoothly peeled off from the back surface 18b and the inner surface 20a. In this respect, the tape member 26 of the present embodiment can suppress the handle member 30 from falling off from the double-sided adhesive tape 28 by the physical locking action between the stopper edge portion 32 and the hooking portion 36.

In the tape member 26 of the present embodiment, the stopper edge portions 32 are provided on the left and right sides of the double-sided adhesive tape 28 with the center in the width direction interposed therebetween, and the hooking portion 36 is provided on the back side of the left and right stopper edge portions 32 in the pulling direction D1, respectively. Therefore, in the tape member 26, when the left and right hooking portions 36 are respectively locked to the left and right stopper edge portions 32, it is possible to further suppress the occurrence of the handle member 30 falling off from the double-sided adhesive tape 28. Further, as illustrated in FIG. 5, when the left and right stopper edge portions 32 are symmetrical to each other, the left and right hooking portions 36 are locked to the left and right stopper edge portions 32 in a well-balanced manner, and it is possible to further suppress the occurrence of the handle member 30 falling off from the double-sided adhesive tape 28, and the same is applied to the stopper edge portions 40, 42, 48, 54, 56, and 58 described below.

The stopper edge portion may have a shape or structure other than the stopper edge portions 32 illustrated in FIGS. 4 and 5. Therefore, next, a modification example of the stopper edge portion will be described in order. Also, in the stopper edge portions 40, 42, 44, 46, 48, 54, 56, and 58 of each modification example described below, the hooking portion 36 is provided on the back side in the pulling direction D1. Accordingly, even in the configurations according to each of the modification examples, when pulling and peeling off the double-sided adhesive tape 28 via the handle member 30, since the hooking portion 36 is hooked on the stopper edge portion 40 or the like and is prevented from coming off, it is possible to prevent the handle member 30 from coming off from the double-sided adhesive tape 28.

Figure 7:
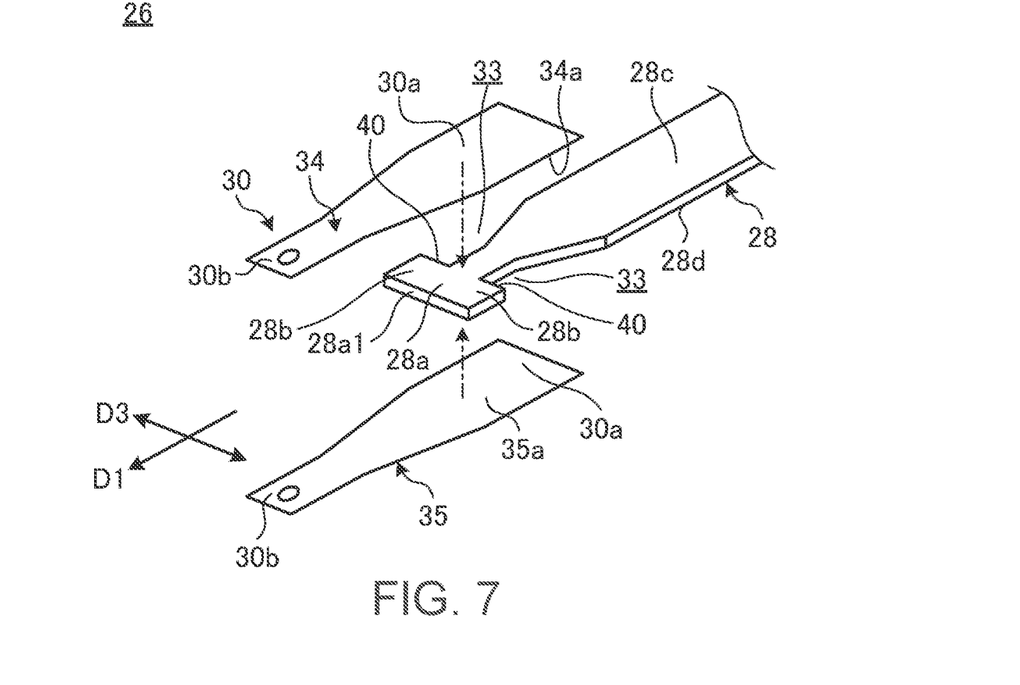
FIG. 7 is an enlarged schematic exploded perspective view of an attachment portion between a double-sided adhesive tape having a stopper edge portion and a handle member, and a peripheral portion thereof in a first modification example.

FIG. 7 is an enlarged schematic exploded perspective view of an attachment portion between the double-sided adhesive tape 28 having the stopper edge portion 40 and the handle member 30, and a peripheral portion thereof in a first modification example. In FIG. 7, reference numerals that are the same as the reference numerals illustrated in FIGS. 1 to 6B indicate the same or similar configurations, and thus, detailed description thereof will be omitted as showing the same or similar function and effect, and the same applies to FIGS. 8 to 14 below.

The stopper edge portion 40 illustrated in FIG. 7 has a different extending direction from the stopper edge portion 32 illustrated in FIG. 3. The stopper edge portion 40 extends along the orthogonal direction D3 orthogonal to the pulling direction D1. As a result, the end portion 28a of the double-sided adhesive tape 28 has a substantially hammer shape in a plan view. With such a stopper edge portion 40 as well, the hooking portion 36 disposed on the back side in the pulling direction D1 can be prevented from coming off.

However, the stopper edge portion 32 along the inclination direction D2 described above can more reliably lock the hooking portion 36 at the time of pulling and peeling off than the stopper edge portion 40 along the orthogonal direction D3. On the other hand, since the shape of the stopper edge portion 40 is simpler than that of the stopper edge portion 32 and the area of the notch portion 33 is easily secured, the work of forming the hooking portion 36 is easy and reliable.

Figure 8:
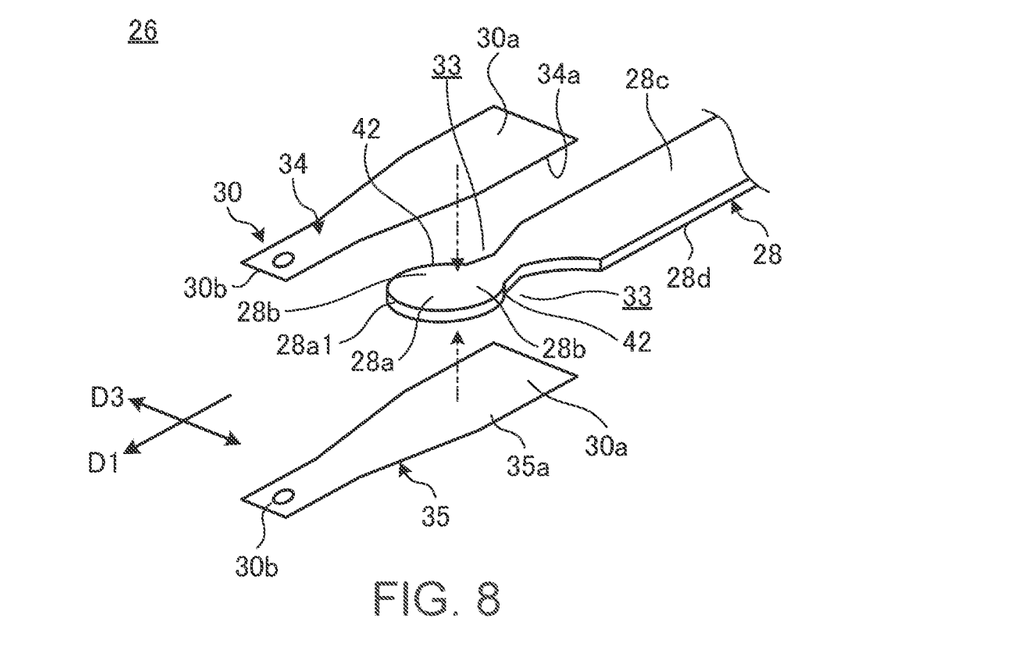
FIG. 8 is an enlarged schematic exploded perspective view of an attachment portion between a double-sided adhesive tape having a stopper edge portion and a handle member, and a peripheral portion thereof in a second modification example.

FIG. 8 is an enlarged schematic exploded perspective view of an attachment portion between the double-sided adhesive tape 28 having the stopper edge portion 42 and the handle member 30, and a peripheral portion thereof in a second modification example.

The stopper edge portion 42 illustrated in FIG. 8 is curved in an arc shape unlike the linear stopper edge portions 32 and 40 described above. As a result, the end portion 28a of the double-sided adhesive tape 28 has a substantially spoon shape in a plan view. Each stopper edge portion 42 is inclined toward the pulling direction D1 side rather than the orthogonal direction D3 when viewed with reference to the center in the width direction of the double-sided adhesive tape 28. With such a stopper edge portion 42 as well, the hooking portion 36 disposed on the back side in the pulling direction D1 can be prevented from coming off.

However, the stopper edge portion 42 has a shape that gradually extends from the center in the width direction to the outside in the width direction of the double-sided adhesive tape 28 while drawing an arc toward the pulling direction D1. For this reason, the hooking portion 36 is more likely to fall off toward the pulling direction D1 than the stopper edge portions 32 and 40 described above. Therefore, considering the locking effect of the hooking portion 36, a shape along the orthogonal direction D3 such as the stopper edge portions 32 and 40 described above or a shape along the inclination direction D2 is preferable to the stopper edge portion 42. On the other hand, since the shape of the stopper edge portion 42 is simpler than that of the stopper edge portions 32 and 40 and the area of the notch portion 33 is easily secured, the work of forming the hooking portion 36 is easy and reliable.

Figure 9:
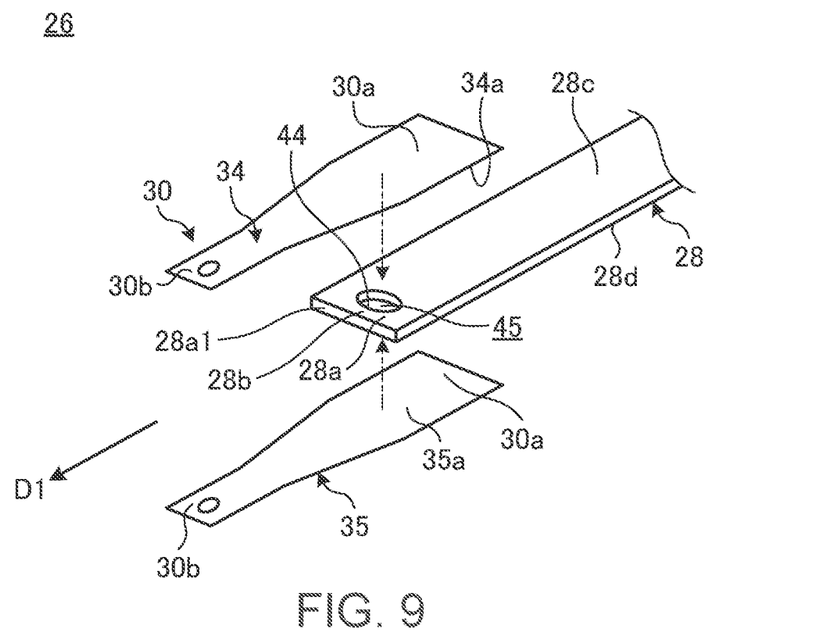
FIG. 9 is an enlarged schematic exploded perspective view of an attachment portion between a double-sided adhesive tape having a stopper edge portion and a handle member, and a peripheral portion thereof in a third modification example.

FIG. 9 is an enlarged schematic exploded perspective view of an attachment portion between the double-sided adhesive tape 28 having the stopper edge portion 44 and the handle member 30, and a peripheral portion thereof in a third modification example.

The stopper edge portion 44 illustrated in FIG. 9 is not formed by the notch portion 33 as in the stopper edge portion 32 and the like illustrated in FIG. 3, but is formed by a through-hole 45. The through-hole 45 is a hole portion that penetrates the double-sided adhesive tape 28 in the thickness direction, and is, for example, oval. The stopper edge portion 44 is an inner peripheral edge portion of the through-hole 45. As a result, the stopper edge portion 44 has a shape that gradually extends from the center in the width direction to the outside in the width direction of the double-sided adhesive tape 28 while drawing an arc toward a direction opposite to the pulling direction D1. The hooking portion 36 may be formed by bonding the adhesive sheets 34 and 35 to each other through the through-hole 45. Therefore, even with such a stopper edge portion 44, the hooking portion 36 disposed on the back side in the pulling direction D1 can be prevented from coming off.

Figure 10:
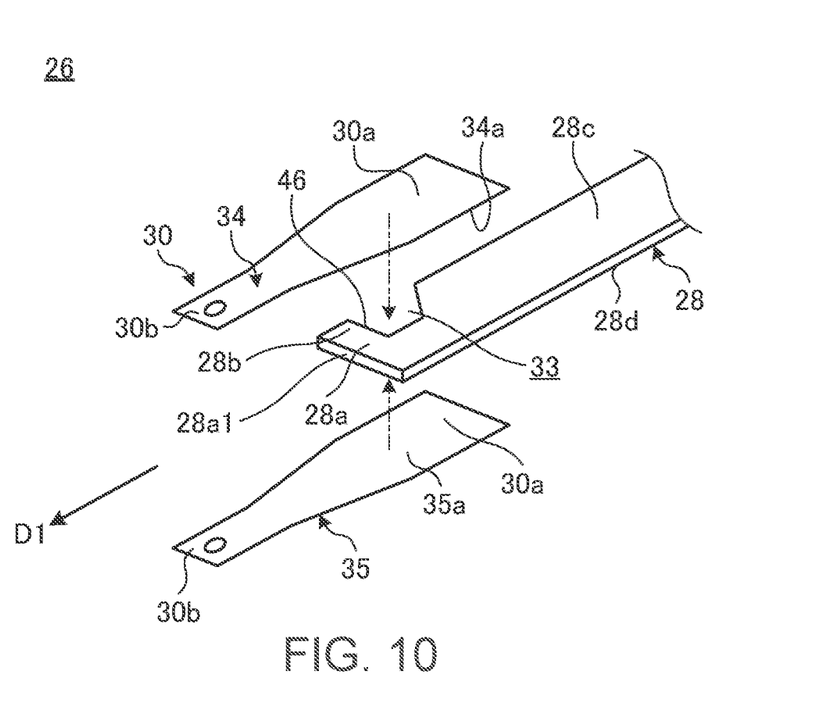
FIG. 10 is an enlarged schematic exploded perspective view of an attachment portion between a double-sided adhesive tape having a stopper edge portion and a handle member, and a peripheral portion thereof in a fourth modification example.

FIG. 10 is an enlarged schematic exploded perspective view of an attachment portion between the double-sided adhesive tape 28 having the stopper edge portion 46 and the handle member 30, and a peripheral portion thereof in a fourth modification example.

The stopper edge portion 46 illustrated in FIG. 10 has a configuration in which the stopper edge portion 40 illustrated in FIG. 7 is provided on only one of the left and right sides. The stopper edge portion 46 extends along the orthogonal direction D3 orthogonal to the pulling direction D1. As a result, the end portion 28a of the double-sided adhesive tape 28 has a substantially hook shape or a hook claw shape in a plan view. With such a stopper edge portion 46 as well, the hooking portion 36 disposed on the back side in the pulling direction D1 can be prevented from coming off.

Figure 11:
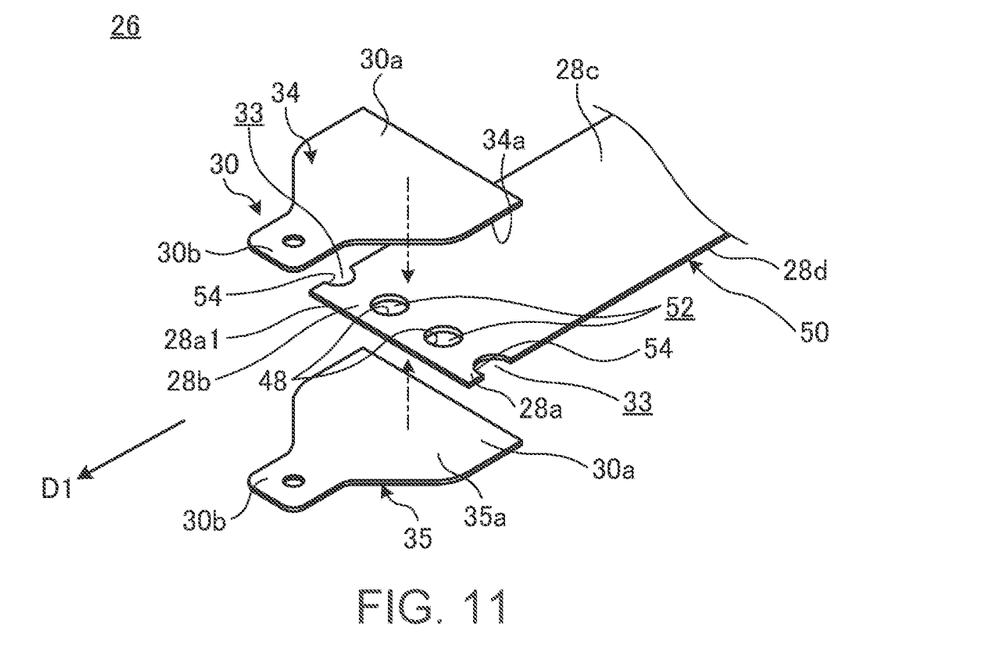
FIG. 11 is an enlarged schematic exploded perspective view of an attachment portion between a double-sided adhesive tape having a stopper edge portion and a handle member, and a peripheral portion thereof in a fifth modification example.

FIG. 11 is an enlarged schematic exploded perspective view of an attachment portion between a double-sided adhesive tape 50 having the stopper edge portion 48 and the handle member 30, and a peripheral portion thereof in a fifth modification example.

The double-sided adhesive tape 50 illustrated in FIG. 11 has the same or a similar basic configuration as the double-sided adhesive tape 28, except that the width dimension is about twice that of the double-sided adhesive tape 28 described above. A pair of stopper edge portions 48 are provided, and each stopper edge portion is an inner peripheral edge portion of two through-holes 52 formed side by side in the width direction of the double-sided adhesive tape 50. The hooking portions 36 may form a pair by bonding the adhesive sheets 34 and 35 to each other through the through-holes 52. The shape of the stopper edge portion 48 is the same as or similar to that of the stopper edge portion 44 illustrated in FIG. 9. Therefore, even with such a stopper edge portion 48, the hooking portion 36 disposed on the back side in the pulling direction D1 can be prevented from coming off.

In the configuration example illustrated in FIG. 11, the notch portions 33 are formed on the left and right side portions of the double-sided adhesive tape 50, and the stopper edge portions 54 are also formed therein. The stopper edge portion 54 has the same shape as the stopper edge portion 42 illustrated in FIG. 8, and the hooking portion 36 is disposed on the back side thereof to prevent the stopper edge portion 54 from coming off. That is, the wide double-sided adhesive tape 50 forms, for example, the four stopper edge portions 48, 48, 54, and 54 disposed side by side on the left and right sides, and can prevent the handle member 30 from coming off more firmly.

Figure 12:
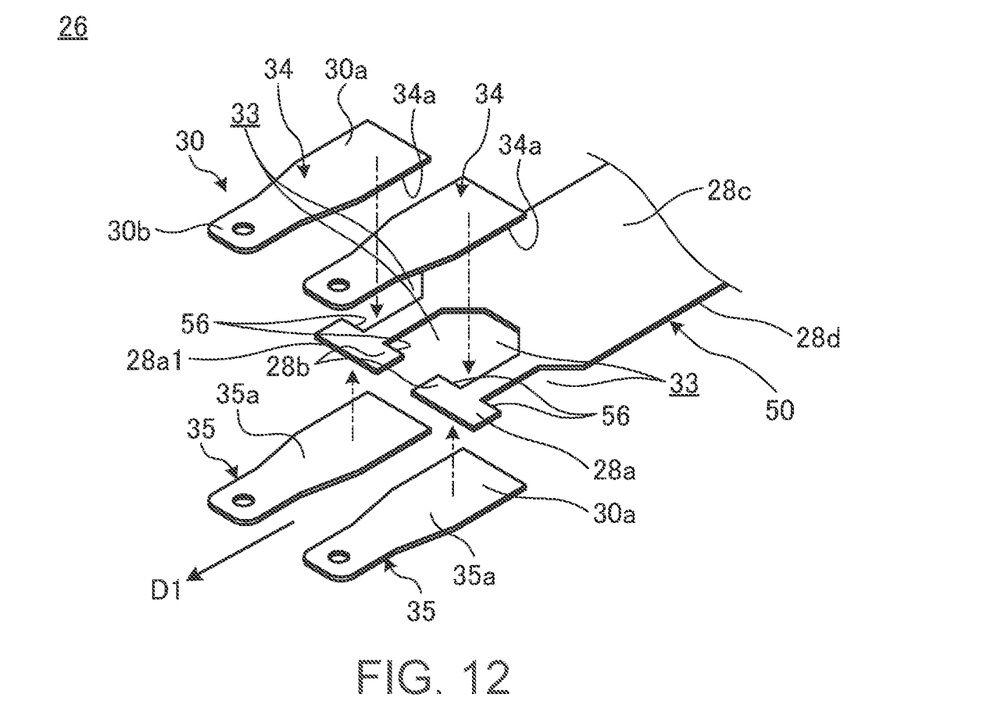
FIG. 12 is an enlarged schematic exploded perspective view of an attachment portion between a double-sided adhesive tape having a stopper edge portion and a handle member, and a peripheral portion thereof in a sixth modification example.

FIG. 12 is an enlarged schematic exploded perspective view of an attachment portion between the double-sided adhesive tape 50 having the stopper edge portion 56 and the handle member 30, and a peripheral portion thereof in a sixth modification example.

The stopper edge portion 56 illustrated in FIG. 12 has a configuration in which a pair of stopper edge portions 56 similar to the pair of stopper edge portions 40 illustrated in FIG. 7 are provided in parallel on the left and right sides of the double-sided adhesive tape 50. Therefore, in this configuration example, the hooking portions 36 disposed on the back side in the pulling direction D1 can be firmly prevented from coming off by the four stopper edge portions 56 disposed side by side on the left and right sides.

Figure 13:
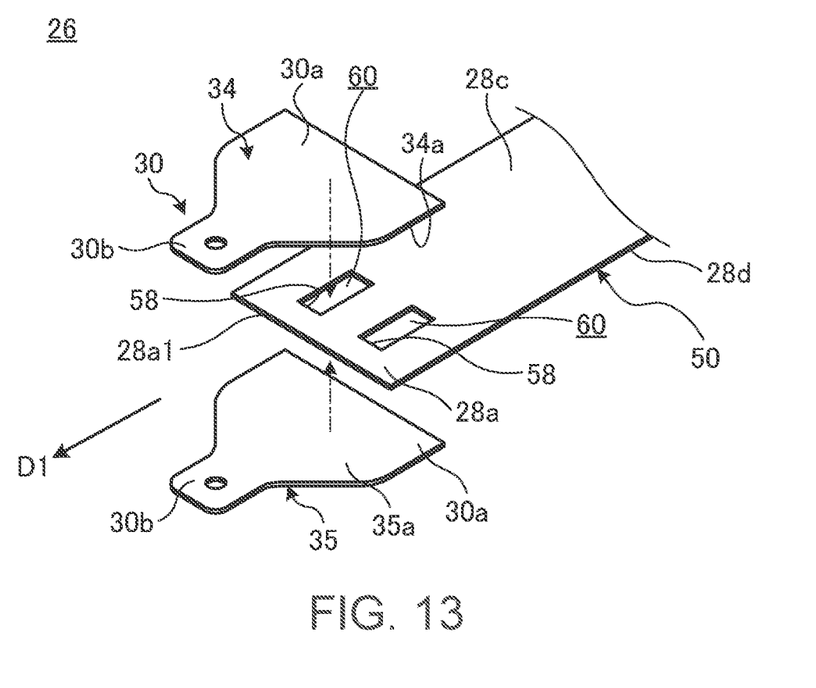
FIG. 13 is an enlarged schematic exploded perspective view of an attachment portion between a double-sided adhesive tape having a stopper edge portion and a handle member, and a peripheral portion thereof in a seventh modification example.

FIG. 13 is an enlarged schematic exploded perspective view of an attachment portion between the double-sided adhesive tape 50 having the stopper edge portion 58 and the handle member 30, and a peripheral portion thereof in a seventh modification example.

A pair of stopper edge portions 58 illustrated in FIG. 13 are provided, and each stopper edge portion is an inner peripheral edge portion of rectangular through-holes 60 formed in a pair on the left and right sides of the double-sided adhesive tape 50. Therefore, even with such a stopper edge portion 58, the hooking portion 36 disposed on the back side in the pulling direction D1 can be prevented from coming off.

Figure 14:
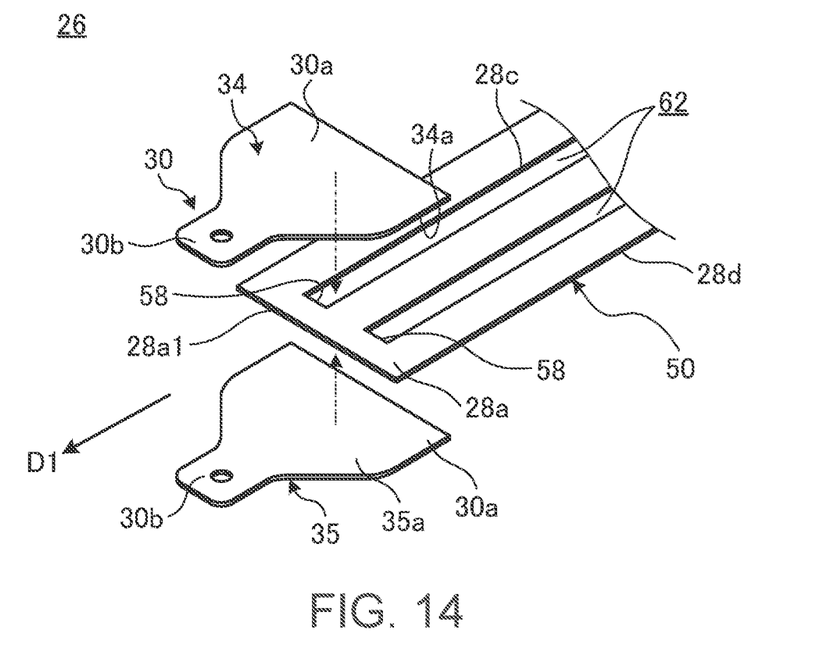
FIG. 14 is an enlarged schematic exploded perspective view of an attachment portion between a double-sided adhesive tape having a stopper edge portion and a handle member, and a peripheral portion thereof in an eighth modification example.

As illustrated in FIG. 14, in the double-sided adhesive tape 50, instead of the pair of through-holes 60 illustrated in FIG. 13, a slit-shaped through-hole 62 extending in the longitudinal direction of the double-sided adhesive tape 50 may be used to form the stopper edge portion 58 on the inner peripheral edge portion thereof.

The present invention is not limited to the above-described embodiment, and it goes without saying that the present invention can be freely modified without departing from the gist of the present invention.

In the above description, the configuration in which the display panel 18 is fixed by the tape member 26 has been illustrated, but the tape member 26 can be used for fixing various components other than the display panel 18 that need to be removed.

The invention claimed is:

1. A tape member comprising:
   a double-sided adhesive tape configured to be pulled and peeled off by pulling an end portion thereof; and
   a handle member attached to the end portion of the double-sided adhesive tape and configured to be gripped when the double-sided adhesive tape is pulled and peeled off, wherein
   the handle member includes:
     a first adhesive sheet fixed to a first adhesive surface of the double-sided adhesive tape, and
     a second adhesive sheet fixed to a second adhesive surface of the double-sided adhesive tape,
   a stopper edge portion, which extends in a direction intersecting a pulling direction when the double-sided adhesive tape is pulled and peeled off, is at the end portion of the double-sided adhesive tape, and
   the handle member includes a hooking portion in which the first adhesive sheet and the second adhesive sheet are bonded to each other on a back side of the stopper edge portion in the pulling direction, and the hooking portion is configured to be hooked on the stopper edge portion when the double-sided adhesive tape is pulled and peeled off.

2. The tape member according to claim 1, wherein
the stopper edge portion extends along a direction orthogonal to the pulling direction or a direction inclined toward a direction opposite to the pulling direction.

3. The tape member according to claim 1, wherein
the double-sided adhesive tape includes a through-hole that extends in a thickness direction, and
the stopper edge portion is an inner peripheral edge portion of the through-hole.

4. The tape member according to claim 1, wherein
the stopper edge portion is on left and right sides of the double-sided adhesive tape with a center thereof interposed between the left and right sides, and
the hooking portion is on a back side of each of the left and right stopper edge portions in the pulling direction.

5. The tape member according to claim 4, wherein
the left and right stopper edge portions have a symmetrical shape.

6. An electronic apparatus comprising:
   a chassis member that includes an inner surface;
   a display panel that includes a display surface and a back surface opposite to the display surface that is supported on the inner surface of the chassis member; and
   a tape member that includes a double-sided adhesive tape configured to be pulled and peeled off by pulling an end portion thereof, and a handle member attached to the end portion of the double-sided adhesive tape and configured to be gripped when the double-sided adhesive tape is pulled and peeled off, wherein the tape member fixes the back surface of the display panel to the inner surface of the chassis member, wherein
   the handle member includes:
     a first adhesive sheet fixed to a first adhesive surface of the double-sided adhesive tape, and
     a second adhesive sheet fixed to a second adhesive surface of the double-sided adhesive tape,
   a stopper edge portion, which extends in a direction intersecting a pulling direction when the double-side adhesive tape is pulled and peeled off, is at the end portion of the double-sided adhesive tape, and
   the handle member includes a hooking portion in which the first adhesive sheet and the second adhesive sheet are bonded to each other on a back side of the stopper edge portion in the pulling direction, and the hooking portion is configured to be hooked on the stopper edge portion when the double-sided adhesive tape is pulled and peeled off.

7. The electronic apparatus according to claim 6, wherein
the end portion of the double-sided adhesive tape and the hooking portion of the handle member are between the back surface of the display panel and the inner surface of the chassis member, and
a part of the handle member protrudes to a side of the display panel.

* * * * *